United States Patent [19]

Ebert

[11] 4,289,923

[45] Sep. 15, 1981

[54] STRAIN RELIEF GROMMET IN COMBINATION WITH A CORD SET EXTENDING FROM AN ELECTRIC MOTOR

[75] Inventor: Robert W. Ebert, Sauk City, Wis.

[73] Assignee: Marathon Electric Manufacturing Corp., Wausau, Wis.

[21] Appl. No.: 77,800

[22] Filed: Sep. 24, 1979

[51] Int. Cl.³ .................. H02G 3/18; H01B 17/26
[52] U.S. Cl. ........................ 174/65 G; 174/153 G; 310/71
[58] Field of Search ............ 174/65 G, 152 G, 153 G, 174/155; 16/2; 248/56; 339/103 B, 107; 310/71, 88, 89

[56] References Cited

U.S. PATENT DOCUMENTS

| | | | |
|---|---|---|---|
| 2,128,883 | 8/1938 | Burt | 339/107 |
| 2,233,909 | 3/1941 | Burt | 339/107 |
| 2,277,637 | 3/1942 | Eby | 174/153 G |
| 3,197,556 | 7/1965 | Simon | 174/153 G |
| 3,502,917 | 3/1970 | Bizoe | 174/153 G |

FOREIGN PATENT DOCUMENTS 2155231 5/1973 Fed. Rep. of Germany ... 174/153 G

OTHER PUBLICATIONS

Massee, D. L., "Sealing Clamp", *IBM Technical Disclosure Bulletin*, vol. 11, No. 7, Dec. 1968.

*Primary Examiner*—Laramie E. Askin
*Attorney, Agent, or Firm*—Andrus, Sceales, Starke & Sawall

[57] ABSTRACT

The strain relief grommet has internally located intermittent clamping teeth and when the grommet is located around a cord set and then lodged in a notch in a frame of a motor, teeth pierce the outer jacket of the cord and engage the internal insulation wrappings around the lead wires. This prevents removal or loosening of the cord from its internal connection in the event the cord set is pulled from outside of the motor.

1 Claim, 6 Drawing Figures

STRAIN RELIEF GROMMET IN COMBINATION WITH A CORD SET EXTENDING FROM AN ELECTRIC MOTOR

BACKGROUND OF THE INVENTION

Previous strain relief techniques consisted of molding a grommet to an electrical cord. This was very costly. Another approach was to crimp "hog rings" onto a standard cord. This metal ring often slipped on the cord or grounded out the motor winding to the frame. The present invention employs a strain relief grommet of molded plastic material of low cost and which prevents slippage of an electrical cord therethrough when in place because of internal teeth in the grommet which pierce the jacket of the cord and bite into the internal insulation coverings which are located inside the outer covering.

SUMMARY OF THE INVENTION

In general the strain relief grommet of the invention is of a split construction and consists preferably of two complementary semicircular half members which may be joined by a hinge. The half members are folded together around the electrical cord extending from an electrical device such as an electric motor and inserted in a notch in the frame of the motor with the hinge located on the upper side of the grommet. The inside of the grommet is provided with rows of intermittent teeth or sharp pointed projections. When the half members forming a grommet are forced into the notch with the cord running through it the grommet is forced to close and the teeth pierce the outer jacket of the cord and place a bite on the inner insulation material. When thus assembled the cord is anchored and is prevented from being pulled through the grommet and from the inside of the motor.

DETAILED DESCRIPTION OF THE DRAWINGS

Figure 1:
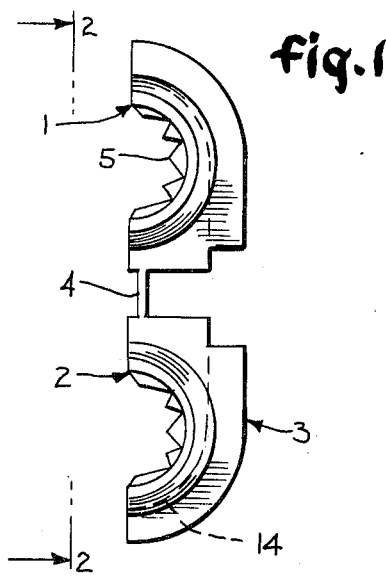
FIG. 1 is an enlarged side view of the strain relief grommet before assembly illustrating a row of teeth inside the semi-circular members of the grommet.
Figure 2:
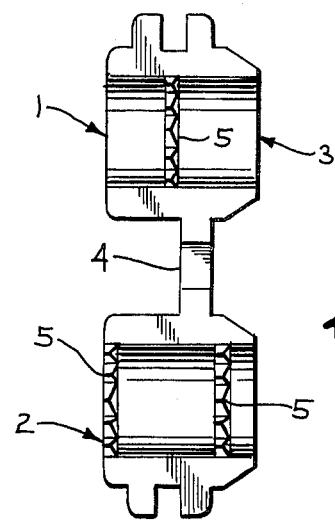
FIG. 2 is a view taken along line 2—2 of Fig. 1 looking inside the grommet before assembly and illustrating three rows of intermittent teeth or sharp projections inside the grommet.
Figure 6:
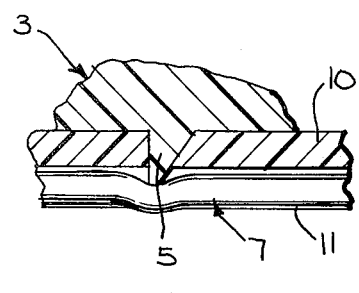
FIG. 6 is a detailed view illustrating the tapered shape of the teeth on the inside of the grommet and after piercing of the jacket of the cord and in engagement with the inner insulation material around the lead wires.

Referring to the drawings there is shown in Fig. 1 the semi-circular halves 1 and 2 of the strain relief grommet 3 which are joined by the hinge 4. Grommet 3 is constructed from a molded insulating material and on the inside is provided with the intermittent clamping teeth or sharp projections 5. Good results have been obtained when the teeth are provided in rows of three as illustrated in Fig. 2 and as illustrated in Fig. 6, the clamping teeth 5 are tapered downwardly to provide each with a sharp end and edges so that they will readily pierce the material into which they are inserted.

Figure 3:
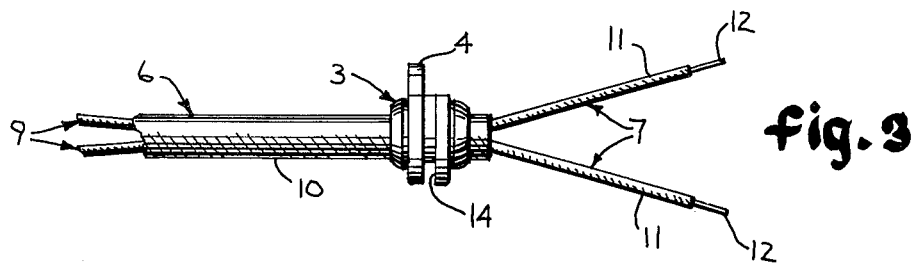
FIG. 3 is a side view illustrating the grommet assembled around a cord set.
Figure 4:
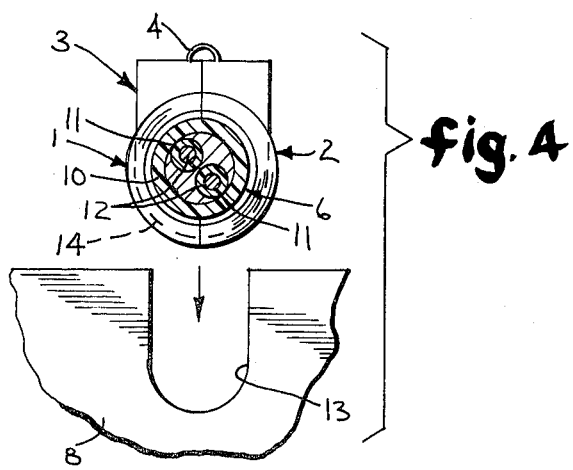
FIG. 4 is a view with parts in section illustrating insertion of the grommet in the notch of an electric motor frame.
Figure 5:
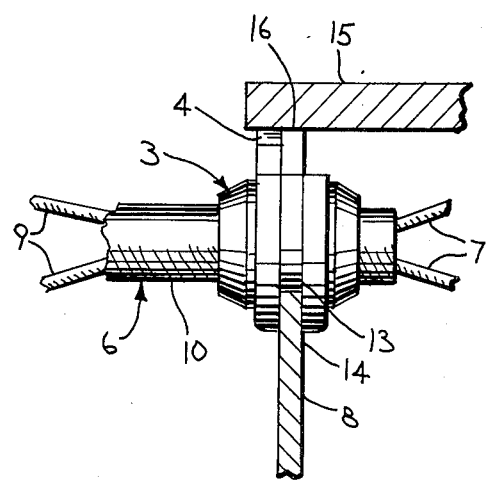
FIG. 5 is a side view with parts in section illustrating the grommet in final position in a motor frame.

In assembling the grommet 3 on the external lead side of a cord set such as cord set 6 the grommet halves 1 and 2 are initially folded around the cord set 6 as illustrated in Fig. 3 with the hinge 4 located on the upper side of grommet 3.

The cord set 6 includes the leads 7 located internally of the motor frame 8 which terminate in external leads 9 located outside the motor frame 8. Two internal and external leads are illustrated but more leads may be employed in service.

The cord set 6 also includes the outer insulating jacket 10 and the inner insulating wrappings 11 which are provided about the wires 12 extending within cord set 6. In assembling cord set 6 about one-eighth inch of the jacket 10 protrudes from grommet 3 on the internal lead side.

After the grommet 3 is located around cord set 6, the grommet and cord set are inserted within the notch 13 and forced down until fully seated in frame 8 with the edges of grommet 3 parallel to the sides of notch 13. The outer portion of grommet 3 is constructed with a central groove 14 which aids in preventing sideways movement of grommet 3 once it is inserted within notch 13. A bracket 15 normally extending around the motor frame 8 is disposed over upper projecting end 16 of frame 8.

When grommet 3 is inserted within notch 13, the notch is of a size so that the halves 1 and 2 are closed with sufficient force to cause penetration of the outer insulating jacket 10 by clamping teeth 5 and into engagement with the inner insulating wrappings 11 located around external lead wires 9. This securely clamps cord set 6 to grommet 3 and prevents cord set 6 from being pulled through the grommet and out of the inside of the motor or loosened from its internal connection. By way of example, Fig. 2 illustrates the rows of teeth 5 which may be employed. However, the number of rows of teeth employed may vary.

Any standard cord material may be used in conjunction with grommet 3 except that the cord jacket 10 must be of a diameter to accord with the size of the grommet 3 which is being employed.

Good results have been obtained when the strain relief grommet has been used on cord sets with jacket diameter of 0.400 inch maximum and 0.350 inch minimum. When installed in a notch 13 of proper width and depth, the strain relief grommet 3 has withstood a pull of 35 pounds. It has been found that the grommet of the invention will perform satisfactorily to prevent a cord set from being pulled through the grommet when inserted into cord insulating material having a thickness of 0.065 inch maximum and 0.045 inch minimum.

The strain relief grommet of the invention provides a less expensive and better way to insure that set cords will not be readily pulled outwardly of an electric motor frame housing or the enclosure of an electric device.

Various modes of carrying out the invention are contemplated as being within the scope of the following claims which particularly point out and distinctly claim the subject matter which is regarded as the invention.

I claim:

1. A strain relief grommet in combination with a cord set and an electric motor having a frame with the cord set extending from the frame said cord set having internal lead wires encased in an inner insulation covering and an outer jacket, the grommet being of insulating material formed of two parts, a plurality of generally sharp, large size intermittently spaced clamping teeth, all of which are tapered downwardly to provide sharp ends and edges to readily penetrate the insulation covering, disposed internally of the respective parts of the grommet, a hinge joining the parts of the grommet together, and a notch in the frame receiving and holding the grommet and clamping the two parts of the grommet together in a closed position within the notch and around the cord set, the clamping teeth projecting through the outer jacket of the cord set and into actual contact with the inner insulation covering to place a bite on the inner insulation covering and thereby secure the grommet to the lead wires in a fixed position to prevent removal or loosening of the cord set in service.

* * * * *

UNITED STATES PATENT AND TRADEMARK OFFICE
CERTIFICATE OF CORRECTION

PATENT NO. : 4,289,923
DATED : September 15, 1981
INVENTOR(S) : ROBERT W. EBERT

It is certified that error appears in the above–identified patent and that said Letters Patent are hereby corrected as shown below:

Column 3, line 1, After "frame" insert a comma (,)

Signed and Sealed this

Twenty-third Day of February 1982

[SEAL]

Attest:

GERALD J. MOSSINGHOFF

Attesting Officer — Commissioner of Patents and Trademarks